(12) United States Patent
Hu et al.

(10) Patent No.: US 10,445,583 B2
(45) Date of Patent: Oct. 15, 2019

(54) METHOD FOR SCROLLING TEXT PROCESSING AND IMAGE PROCESSING APPARATUS USING THE SAME

(71) Applicant: Novatek Microelectronics Corp., Hsinchu (TW)

(72) Inventors: Pengyuan Hu, Xi'an (CN); Yongchao Li, Xi'an (CN); Chun-Wei Chen, Taipei (TW); Chun Wang, Shanghai (CN); Xin Huang, Xi'an (CN)

(73) Assignee: Novatek Microelectronics Corp., Hsinchu (TW)

( * ) Notice: Subject to any disclaimer, the term of this patent is extended or adjusted under 35 U.S.C. 154(b) by 120 days.

(21) Appl. No.: 15/807,600

(22) Filed: Nov. 9, 2017

(65) Prior Publication Data

US 2019/0130187 A1    May 2, 2019

(30) Foreign Application Priority Data

Oct. 27, 2017    (CN) .......................... 2017 1 1022796

(51) Int. Cl.
| | |
|---|---|
| *G06K 9/00* | (2006.01) |
| *G06T 7/77* | (2017.01) |
| *G06K 9/46* | (2006.01) |
| *G06K 9/62* | (2006.01) |
| *H04N 7/01* | (2006.01) |

(52) U.S. Cl.
CPC ....... *G06K 9/00718* (2013.01); *G06K 9/4604* (2013.01); *G06K 9/4642* (2013.01); *G06K 9/6212* (2013.01); *G06T 7/77* (2017.01); *H04N 7/013* (2013.01); *G06T 2207/10016* (2013.01); *G06T 2207/20072* (2013.01); *H04N 7/014* (2013.01); *H04N 7/0127* (2013.01); *H04N 7/0142* (2013.01)

(58) Field of Classification Search
CPC ............. G06K 9/00718; G06K 9/6212; G06K 9/4642; G06K 9/4604; G06T 7/77; G06T 2207/10016; G06T 2207/20072; H04N 7/014; H04N 7/0127
USPC ........................................................ 382/170
See application file for complete search history.

(56) References Cited

U.S. PATENT DOCUMENTS

| | | | |
|---|---|---|---|
| 2004/0101047 A1* | 5/2004 | Yang ...................... | H04N 5/145 375/240.08 |
| 2009/0016618 A1* | 1/2009 | Zhou .................... | G06K 9/3266 382/232 |

* cited by examiner

*Primary Examiner* — Andrew M Moyer
(74) *Attorney, Agent, or Firm* — JCIPRNET (57) ABSTRACT

An image processing method and an image processing apparatus that utilize scrolling text information and moving edge-pairs of an edge map to determine text regions in interpolated frame is introduced herein. Text blocks are detected according to the moving edges-pair of the edge map. Next, a first moving vector histogram and a second moving vector histogram are built according to the detected text blocks. An existence of scrolling text and motion vector of the scrolling text in the frames are determined according to the first and second moving vector histograms. A scrolling text region in at least one of the first frame and the second frame is determined in block line unit, and positions of each scrolling text pixels in an interpolated are determined according to the motion vector of the scrolling text and the scrolling text region in the at least one of the first frame and the second frame.

20 Claims, 9 Drawing Sheets

METHOD FOR SCROLLING TEXT PROCESSING AND IMAGE PROCESSING APPARATUS USING THE SAME

CROSS-REFERENCE TO RELATED APPLICATION

This application claims the priority benefit of China application serial no. 201711022796.0, filed on Oct. 27, 2017. The entirety of the above-mentioned patent application is hereby incorporated by reference herein and made a part of this specification.

BACKGROUND OF THE INVENTION

1. Field of the Invention

The invention generally relates to an image processing method and an image processing apparatus, in particular, to an image processing method and an image processing apparatus that utilize scrolling text information and moving edges related to the text to determine text regions in interpolated frame.

2. Description of Related Art

Nowadays, with the developments in display technology and processing capability, the market demands for performance requirements of high resolution, high brightness and low-power consumption and high frame rate in display technology. To increase the frame rate of a video sequence, frame rate up conversion (FRC) systems are developed to generate interpolated frames based on the current existing frames. For example, an interpolated frame may be generated based on two successive frames. If the video sequence contains texts, text regions will be interpolated to the interpolated frame.

Conventional text detection methods usually use edge information only to locate text region in the existing frames. However, edge information only is not distinct enough to detect the text regions in video sequences, especially for the video sequences that have complex backgrounds (e.g., fences or trees in background). As a result, the conventional text detection methods may fail to detect text or introduce lots of false positive in video sequence. Eventually, it will lead to visual side effects in interpolated frames and result in the dissatisfaction with the up-rated video sequence.

That is, an image processing method capable of detecting text regions in the frames of a video sequence with high accuracy, and correctly interpolating the detected text region to interpolated frames of an up-rated video sequence without visual artifacts is desirable.

SUMMARY OF THE INVENTION

The invention is directed to an image processing method and an image processing apparatus, which utilize scrolling text information and a text detection map to determine text regions in interpolated frame of a FRC system, thereby improving the accuracy and reducing visual artifacts in the up-rated video sequence.

In an exemplary embodiment, the image processing apparatus includes a memory storing a plurality of modules and a processor configured to executing the plurality of modules stored in the memory. The plurality of modules comprises a text detection module, a scrolling text (ST) judgment module, a previous scrolling information module, a text prediction module, and a motion vector assignment module. The text detection module is configured to detect text blocks according to moving edge-pairs of an edge map which is obtained according to a first frame and a second frame of a video sequence. The ST judgment module is further configured to build a first motion vector histogram and a second motion vector histogram according to the text blocks detected by the text detection module. The ST judgment module is configured to determine an existence of scrolling text, a direction of the scrolling text and a motion vector of the scrolling text between the first frame and the second frame according to the first motion vector histogram and the second motion vector histogram. The text prediction module is configured to locate a scrolling text region in at least one of the first frame and the second frame according to a plurality of text block lines and the motion vector of the scrolling text, where a direction of the text block lines is the same as the direction of the scrolling text. The text prediction module is further configured to determine a position of each scrolling text pixel in an interpolated frame according to the motion vector of the scrolling text and the scrolling text region in the at least one of the first frame and the second frame.

In an exemplary embodiment, the ST judgment module determines local peaks of the first motion vector histogram and the second motion vector histogram, thereby determining the existence of the scrolling text, the direction of the scrolling text and the motion vector of the scrolling text. The existence of the scrolling text may be determined according to a set of condition, and the motion vector of the strolling text may be determined according to the local peaks of the first and second motion vector histograms.

In an exemplary embodiment, the text prediction module may determine the plurality of text block lines among a plurality of block lines, where each of the block lines is extended in the direction of scrolling text and each of the block lines comprises a series of blocks. The text prediction module eliminates isolated text block lines and sets a region that comprises a plurality of successive text block lines as the scrolling text region.

In an embodiment of the present application, the image processing apparatus further comprises a motion vector assignment module which is configured to divide the scrolling text region in interpolated frame into blocks and classify each of the blocks to a text block or a background block according to the scrolling text pixel map of the interpolated frame. The motion vector assignment module is further configured to assign the motion vector of the scrolling text for text blocks of the scrolling text region and assign a background motion vector for the background blocks of the scrolling text region.

In an exemplary embodiment, the image processing method includes steps of detecting text blocks according to moving edge-pairs of an edge map which is obtained according to the first frame and the second frame; building a first motion vector histogram and a second motion vector histogram according to the detected text blocks; determining an existence of scrolling text and a motion vector of the scrolling text between the first frame and the second frame according to the first motion vector histogram and the second motion vector histogram; locating a scrolling text region in at least on the first frame and the second frame according to a plurality of text block lines and the motion vector of the scrolling text; and determining a position of each pixel in an interpolated frame according to the motion vector of the scrolling text and the scrolling text region in at least one of the first frame and the second frame.

In another embodiment, the image processing method further comprises a step of dividing the scrolling text region in interpolated frame into blocks, classifying each of the blocks into a text block or a background block according to the scrolling text pixel map of the interpolated frame, assigning the motion vector of the scrolling text for text blocks of the scrolling text region and assigning a background motion vector for background blocks of the scrolling text region.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Reference will now be made in detail to the present preferred embodiments of the invention, examples of which are illustrated in the accompanying drawings. Wherever possible, the same reference numbers are used in the drawings and the description to refer to the same or like parts.

Figure 1:
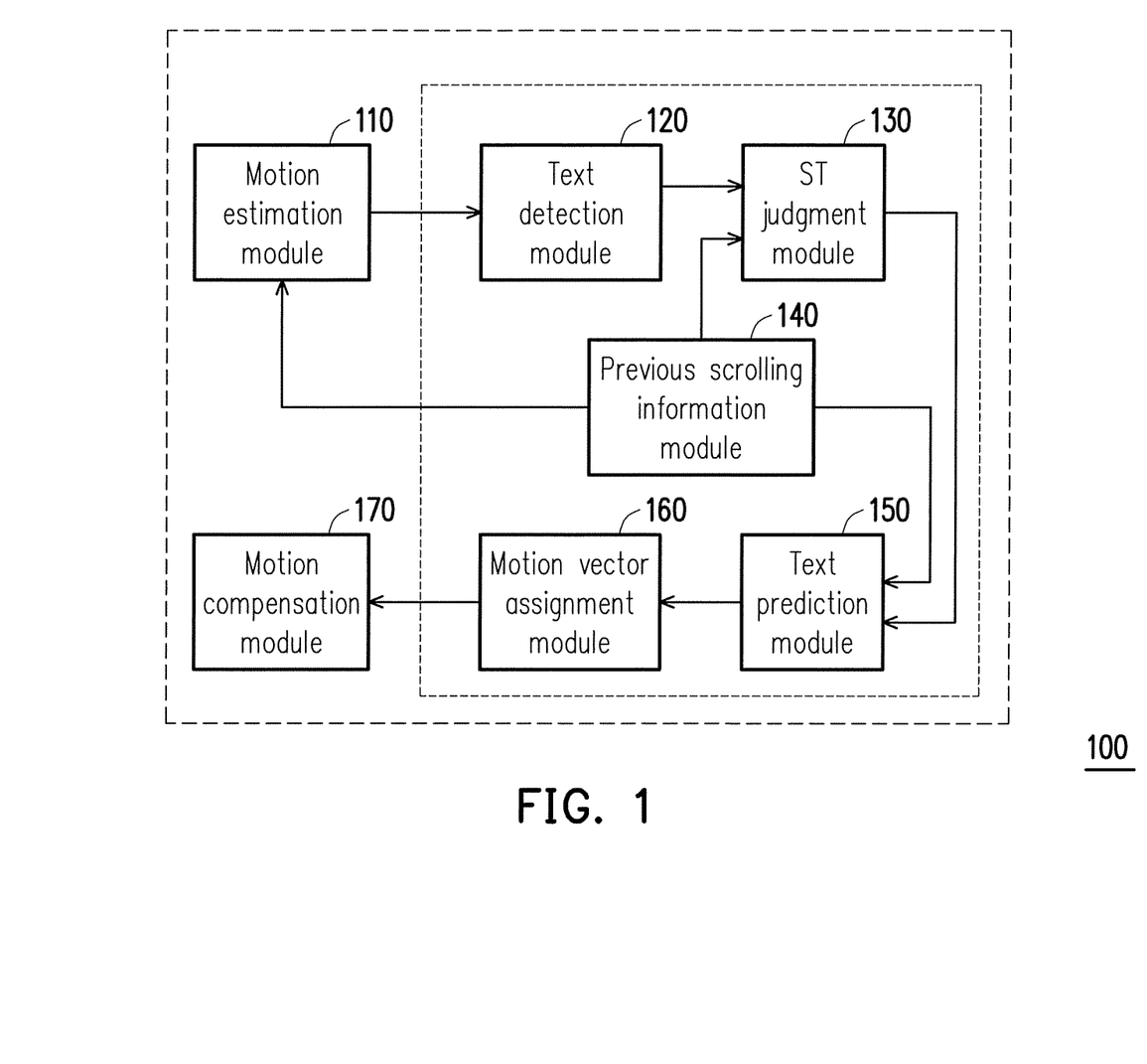
FIG. 1 is a block diagram illustrating overall structure of the image processing apparatus according to an embodiment of the invention.

FIG. 1 illustrates the overall structure of the image processing apparatus according to an embodiment of the invention. Referring to FIG. 1, the image processing unit 100 may include a memory storing a plurality of modules and a processor configured to execute the modules stored in the memory. The modules include a motion estimation module 110, a text detection module 120, a ST judgment module 130, a previous scrolling information module 140, a text prediction module 150, a motion vector assignment module 160 and a motion compensation module 170.

The processor may include a single processor or multiple processors to perform the exemplary image processing method, but the number of the processors does not limit the invention. In the present embodiment, the processor is, for example, a micro-controller unit (MCU), a central processing unit (CPU), or other microprocessor, a digital signal processor (DSP), a programmable controller, application specific integrated circuits (ASIC), a programmable logic device (PLD), or other similar devices.

In the present embodiment, the memory is, for example, RAM, flash memory, ROM, EPROM, EEPROM, registers, hard disk, a removable disk, a CD-ROM, or any other form of machine or computer readable storage medium. The memory can be coupled to the processor such that the processor can read information from, and write information to, the memory. In the alternative, the memory can be integral to the processor.

The motion estimation module 110 is configured to estimate motions between a current frame and previous frames of a video sequence. The current frame and the previous frames may be successive frames in a video sequence, but the invention is not limited thereto. The current frame may be not successive with the previous frames, and alternately, the current frame and the previous frames may belong to different video sequences.

The text detection module 120 is configured to detect possible text blocks according to edge information which are detected in the first and second frames. The text detection module 120 may detect edge information in the first and second frames in at least one direction, and use the edge information to detect the possible text blocks in the first and second frames. In an example, the text detection module 120 may detect edge information in a specific direction (e.g., horizontal direction, or vertical direction, or any other direction in space), and then detect the possible text blocks according to the edge information detected in the specific direction. In another example, the text detection module 120 may detect edge information in a plurality of different directions, and then uses the detected edge information in the plurality of different directions to detect the text blocks in the first and second frames. The edge information may include strong moving edge-pairs between the first and second frames, but the invention is not limited thereto. It is worth noting that the text detection module 120 may detect possible text blocks based on the following assumptions:

(i) Text is of highly contrast to background;

(ii) Characters in text features strong vertical edge-pairs that are horizontally alligned or Characters in text features strong horizontal edge-pairs that are vertically alligned; and (iii) Scrolling text relates to edges moving in every frame of a video sequence.

Figure 3A:
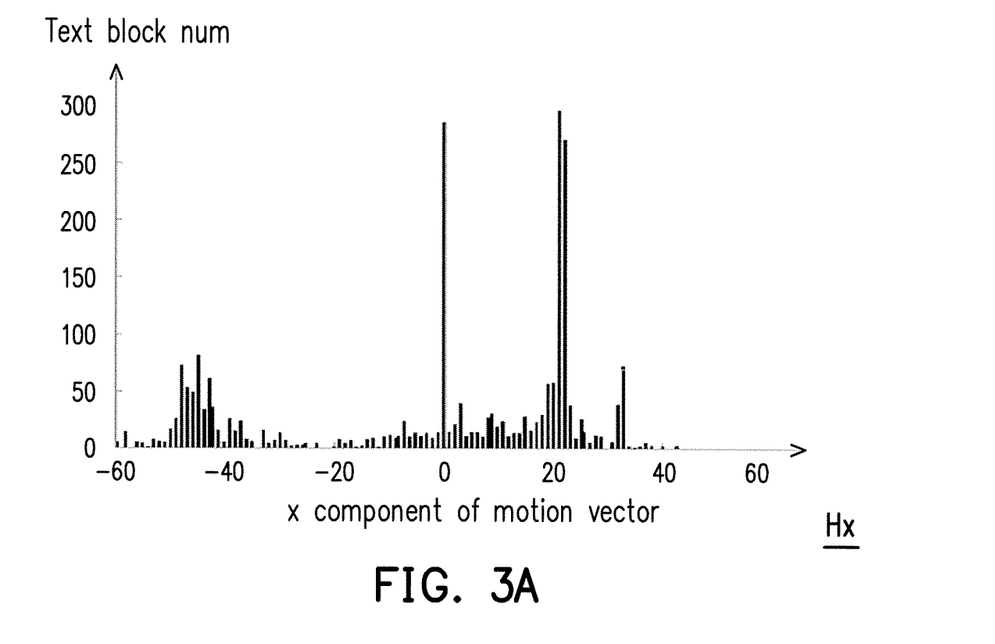
FIGS. 3A-3B illustrate exemplary examples of motion vector histograms in a first direction and a second direction, respectively.
Figure 3B:
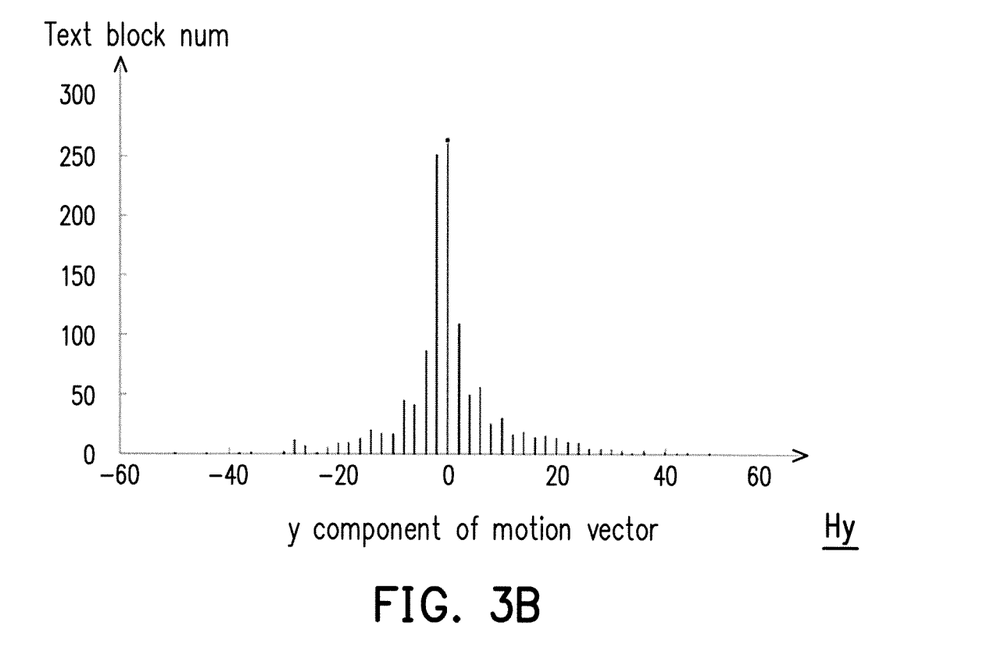

The ST judgment module 130 is configured to determine the existence of scrolling text among frames of a video sequence, and to determine the direction and the motion vector of the scrolling text if scrolling text is existed. Preferably, the first and second frames of the video sequence are successive frames, but the invention should not be limited thereto. The ST judgment module 130 may be utilized to determine the existence of scrolling text, the direction and motion vector of the scrolling text in non-successive frames of the video sequence. The ST judgment module 130 may build a first motion vector histogram and a second motion vector histogram according to the text blocks which are detected by the text detection module 120. The first motion vector histogram may correspond to a x-component of the motion vector, and the second motion vector histogram may correspond to a y-component of the motion vector, but the invention is not limited thereto. For example, FIG. 3A shows the first motion vector histogram Hx (x-component of the motion vector); and FIG. 3B shows the second motion vector histogram Hy (y-component of the motion vector).

In addition, the ST judgment module 130 may detect local peaks of the first and second motion vector histograms, receive previous scrolling information from the previous scrolling information module 140, and determine whether there is scrolling text between the first and second frames according to the detected local peaks and the previous scrolling information. The ST judgment module 130 determines that the scrolling text is existed between the first and second frames when a set of conditions are satisfied. For example, the set of the condition includes:

(i) one of the first local peak and the second local peak is concentrated at zero and the other one is corresponding to the motion vector of the scrolling text;

(ii) the local peak corresponding to the motion vector of the scrolling text exceeds a preset threshold;

(iii) the local peak corresponding to the motion vector of the scrolling text exceeds a proportional value of text block numbers; and (iv) the local peak corresponding to the motion vector of the scrolling text remain unchanged among a number of successive frames in the video sequence.

Once the scrolling text is existed, the direction of the scrolling text and the motion vector of the scrolling text may be determined accordingly. For example, the direction of the scrolling text is the direction of the motion histogram whose the local peak is not concentrated at zero; and the motion vector represents the scrolling text's motion in the direction of the scrolling text.

After ST judgment module 130 decides that there is scrolling text between the first and second frames and the motion vector of the scrolling text is obtained, the text prediction module 150 may locate a scrolling text region in the first and second frames. The text prediction module 150 may locate the scrolling text region according to a plurality of text block lines and the motion vector of the scrolling text. The plurality of text block lines is determined by selecting the block lines that meet predetermined conditions, where the each of the block lines comprises a series of block and is extended in the direction of the scrolling text. For example, to determine whether a block line is a text block line, the following steps are performed:

(i) computing a histogram represent the motion vectors of the current block line;

(ii) finding a peak (most appearing motion vector) of the histogram; and (iii) comparing a similarity between the peak of the histogram and the local peak associated with the scrolling text to obtain a comparison result.

If the comparison result is greater than a predetermined threshold, the current block line is determined as a text block line. Otherwise, the current block line is not a text block line. In addition, since the scrolling text region should be consistent over a number of successive frames, the temporal scrolling text region may be used to determine whether the current block line is a text block line. Since the scrolling text region is included of a number of text block lines, isolated text block lines should be removed from scrolling text regions. The text prediction module 150 is configured to utilize the temporal scrolling text region obtained from the previous scrolling information module 140 to determine whether the current block line is the text block line. And the text prediction module 150 is further configured to remove the isolated text block lines from the scrolling text regions. As a result, the scrolling text region is located by the text prediction module 150.

Once the scrolling text region in at least one of the first frame and the second frame are determined, the scrolling text pixels in interpolated frame may be obtained according to the motion vector of the scrolling text and the scrolling text region in at least one of the first frame and the second frame. The text prediction module 150 is configured to determine a position of each scrolling text pixel in an interpolated frame according to the motion vector of the scrolling text and the scrolling text region in at least one of the first frame and the second frame. In an example, assuming that there is scrolling text between two successive $f_n$ and $f_{n+1}$, the direction of the scrolling is x (e.g., horizontal direction) and the motion vector of the scrolling text is MV(v,0). For a pixel (i,j) which is considered as scrolling text pixel in $f_n$, its position in $f_{n+1}$ is (i',j') and the relationship between (i,j) and (i',j') is shown in equation (1) as follows:

$$\begin{cases} i' = i + v \\ j' = j \end{cases} \quad (1)$$

$$f_n(i, j) = f_{n+1}(i', j')$$

Similar to the equation (1), the position (i",j") in interpolated frame $f_{int\_er}$ can be computed using equation (2) as follows:

$$\begin{cases} i'' = i + v/2 \\ j'' = j \end{cases} \quad (2)$$

$$f_n(i, j) = f_{inter}(i'', j'')$$

$$\begin{cases} i'' = i' - v/2 \\ j'' = j \end{cases}$$

$$f_{n+1}(i', j') = f_{inter}(i'', j'')$$

Figure 5:
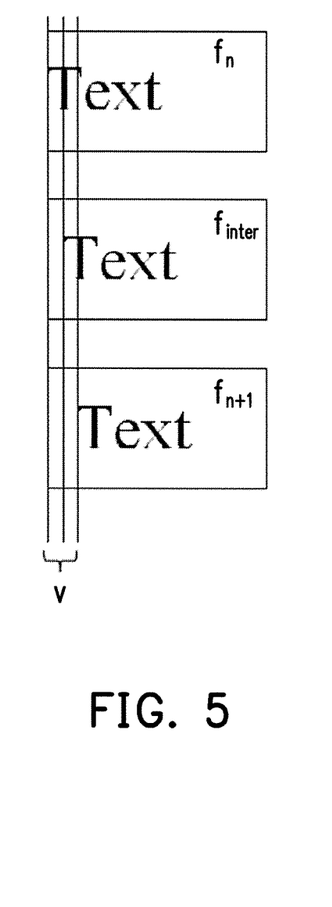
FIG. 5 is an exemplary example showing an exemplary example of the first frame, second frame and the interpolated frame according to an embodiment of the invention.

Generally speaking, the position of each scrolling text pixel in the interpolated frame ($f_{inter}$) is obtained based on the scrolling motion vector MV(v,0) and the scrolling region in at least one of the first frame ($f_n$) and the second frame ($f_{n+1}$). It should be noted that the above example assumes that the scrolling text is in x direction, thus the scrolling text vector is MV(v,0). If the scrolling text is in y direction (vertical direction), the scrolling text vector may have form of MV(0,v). When all scrolling text pixels of the interpolated frames are calculated, the text region in interpolated frame is obtained. FIG. 5 shows an example of two successive frames $f_n$ and $f_{n+1}$, and the interpolated frame which is obtained according to the motion vector of the scrolling text MV(v,0) and scrolling text region in at least one of the frames $f_n$ and $f_{n+1}$.

The motion vector assignment module 160 is configured to divide the scrolling text region in interpolated frame to blocks, classify the each of the blocks to a text block or a background block according to the scrolling text pixel map of the interpolated frame; and assign the motion vector of the scrolling text for the text blocks of the scrolling text region and assigning a background motion vector for the background blocks of the scrolling text region.

The motion compensation module 170 is configured to compensate the motion between the first frame and the second frame to the interpolated frame so as to generate the up-rate video sequence.

Figure 2A:
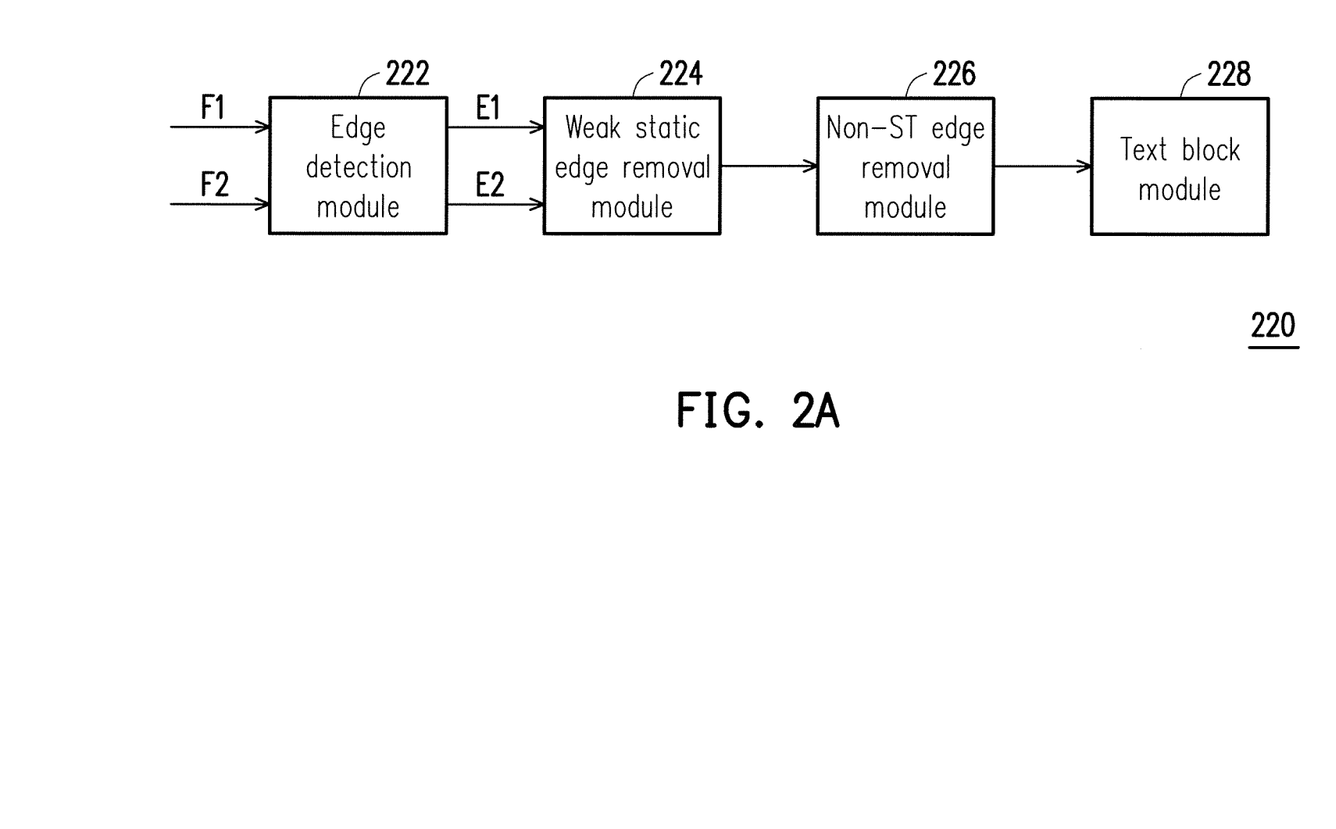
FIGS. 2A-2C are block diagrams illustrating configurations of a text detection module of the image processing apparatus in FIG. 1.

FIG. 2A illustrates configuration of text detection module 220 according to an embodiment of the invention. The text detection module 220 includes an edge detection module 222, a weak static edge removal module 224, a non-ST edge removal 226 and a text block module 228. The edge detection module 222 is configured to detect edges in the first and second frames F1, F2 in a specific direction in space or in a plurality of directions in spaces. The edge detection module 222 may detect edges in the first and second frames F1, F2 by performing a convolution operation of an edge detection mask and the frames. The edge detection mask can be a vertical, horizontal, or diagonal edge filter, or any combination thereof. For example, the edge detection mask can be a Sobel, Canny, Robert, etc. Mathematically, the convolution operation of the edge detection mask (M) and the frame (F) can be represented as follows:

$$E = F \otimes M \quad (3)$$

The edge detection module 222 receives the first image frame F1 and the second image frame F2, detects edges on the first and second image frames, and outputs a first and second edge maps E1 and E2 which contain edge information detected in the first and second image frames F1 and F2, respectively.

The weak static edge removal module 224 is configured to remove the weak edges and static edges from the edge maps because the static edges and the weak edges are usually not relevant to text regions in the frames. To remove weak and static edges from the edge map, a binary map D is calculated by the equation (4) below:

$$D(i,j) = \begin{cases} 1 & \text{abs}(E1(i,j) - E2(i,j)) > T \\ 0 & \text{else} \end{cases} \quad (4)$$

where D(i,j) stands for the value of the binary map at position (i,j); abs (e.g., absolute difference operation) is an operation to calculate the temporal difference between two edge maps E1 and E2; T is a predetermined threshold.

The binary map D only store two binary values (either 1 or 0). If the absolute difference between the edge map E1 and the edge map E2 in a specific position (i,j) is greater than the predetermined threshold T, the binary map value D(i,j) will store 1. Otherwise, the binary map D(i,j) store 0.

It should be noted that text relates to strong edges and stroke of text in an edge map appears as a pulse signal. Pixel value changes from background to text and then return back to background. Furtheii lore, the change between background and text is relatively high. Take white font in black background as example, pixel value is relatively low (black) in background region and then rising to high value (white) and then failing to background (black). Therefore, edge-pair is related to text in image. In order to find edge-pairs between two image frames, a map V that may represent rising edges, falling edges, and non-edge in each position of the image frames F1, F2 is calculated according to the following equation (5).

$$V(i,j) = \begin{cases} 1 & D(i,j) != 0 \;\&\&\; E(i,j) > T \\ 0 & \text{else} \\ -1 & D(i,j) != 0 \;\&\&\; E(i,j) < -T \end{cases} \quad (5)$$

Where D(i,j) is the value of binary map D at position (i,j); E(i,j) is the value of the edge map E at position (i,j); and T is a predetermined threshold.

According to equation 5, when E(i,j) is greater than the positive predetermined threshold T and D(i,j) is not zero, map V store value 1. When E(i,j) is smaller than the negative predetermined threshold "–T" and D(i,j) is not zero, map V store value "–1". Otherwise, the map V store 0. It is worth noting that the value 1 of the map V represents a rising edge; value –1 of the map V represent a failing edge; and value 0 of the map V represents no edge.

The non-ST edge removal module 226 is configured to further remove non-ST edges which are considered as not relating to the text region in the frames. Stroke width is a very important parameter to remove false positive (single edge or edge-pair that the distance between rising edge and falling edge is much less or bigger than stroke width) to determine the text region based on the map V. Character stroke of text in an edge map appears as a pulse signal, where pixel value changes from background to text (e.g., rising edge) and then returns back to background (e.g., falling edge). Take white font in black background as example, pixel value is relatively low in background region and then rising to high value and then failing to background. Therefore, an edge-pair which comprises a rising edge and a falling edge may relate to text in an image.

For example, if text is high density vertical edge-pairs that are horizontally aligned, the distance between the rising edge and failing edge is defined as stroke width, which is almost the same for all text characters in a video sequence. It is worth noting that the stroke width mentioned here is a simple version of stroke width transform (SWT) which is hard to implement for hardware. Hence, to compute histogram of distance between the edge-pair, the distance that has the most appearance time is stroke width. For a pixel that is not 0 in map V, if a window centered as current pixel has corresponding value, it is regarded as an edge that is related to text character; otherwise, the pixel is set to 0. The window size is associated with stroke width. For example, the window size is set to a value that is a little bigger than twice the stroke width. However, the invention should not be limited thereto, and the window size is adjusted according to the design requirements (e.g., processing speed and/or accuracy).

After removing non-ST edges from the map V, the map RV contains edges (e.g., edge-pairs with proper stroke width) that are related to the text regions in the frames.

The text block module 228 is configured to render the pixel-based map RV to a blocks for subsequent processing to fit into the block matching based motion estimation and compensation algorithm that most FRC system adopted. It should be noted that the map RV is in pixel-based map, where each of the value of the map RV is corresponding to a pixel of the frames (F1 and/or F2). However, the motion estimation and motion compensation algorithms in most FRC system are block-based motion estimation and block-based motion compensation. Therefore, the text block module 228 may render the pixel-based map RV to blocks for subsequent processing to fit into the block matching based motion estimation and compensation algorithms. Nevertheless, the invention should not be limited to block level map, the pixel level map RV may be directly used for the subsequent processing if it is applicable.

Figure 2B:
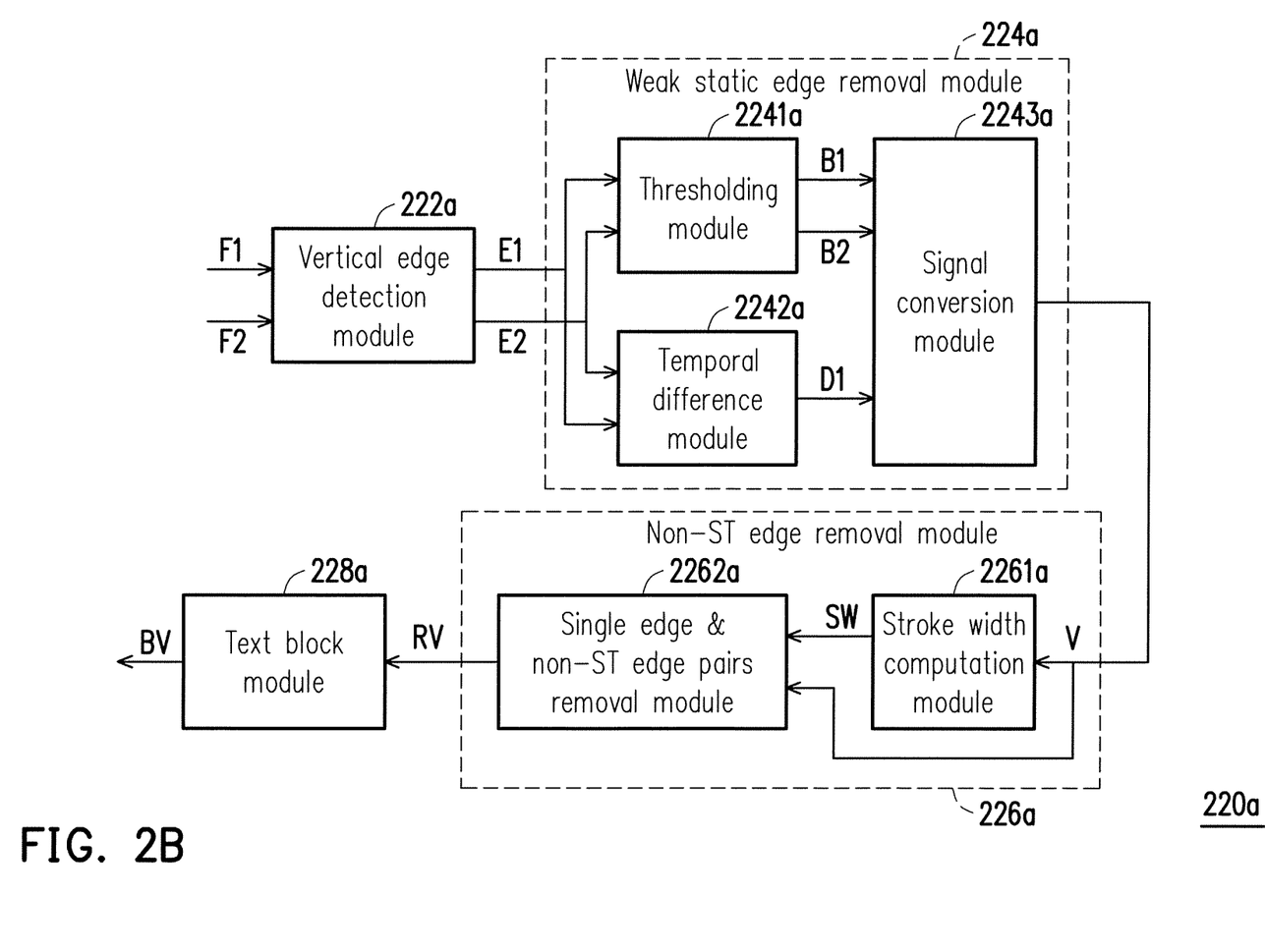
Figure 2C:
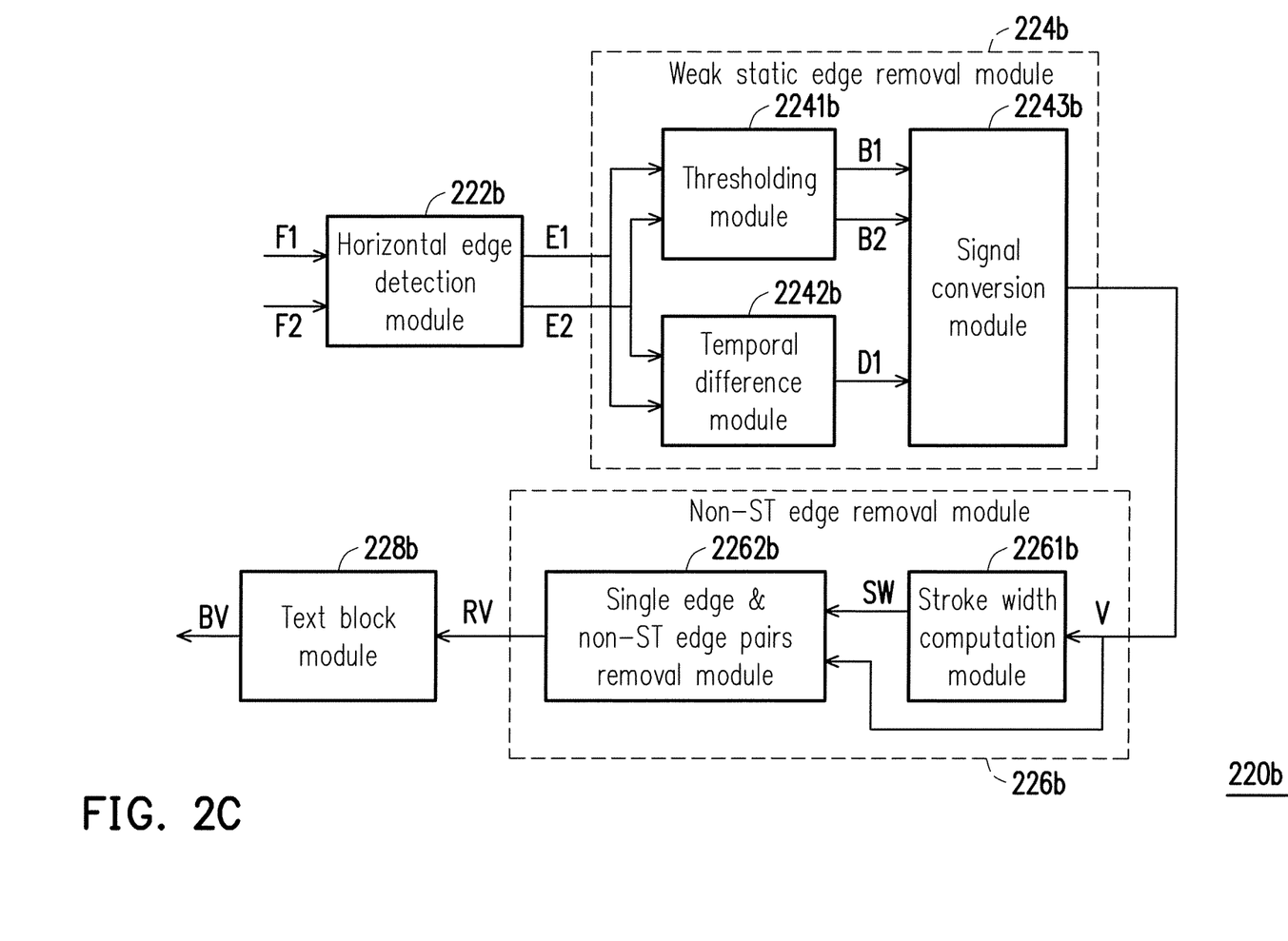

FIGS. 2B-2C illustrate configurations of the text detection module of the image processing apparatus according to an embodiment of the present application. Referring to FIG. 2B, the text detection module 220a include a vertical edge detection module 222a, a weak static edge removal module 224a, a non-ST edge removal module 226a and a text block module 228a.

The vertical edge detection module 222a is configured to receive a first frame F1 and a second frame F2, detect the edges E1, E2 in vertical direction and output the detected vertical edges E1, E2. It should be noted that the first and second frames F1 and F2 may be two successive frames in a video sequence, but the invention should not be limited thereto. The first and second frames F1, F2 can be arbitrary frames in a video sequence or in different video sequences. For example, the vertical edge maps (E1, E2) which represent the vertical edges may be computed by convolution of the frames (F1, F2) and an edge mask as shown in equation 3. For another example, if F1 and F2 stands for successive frames of a video sequence, F(i,j) means the pixel value in image F at position (i,j), then the vertical edge maps (E1, E2) can be computed according to the equation (6).

$$E(i,j)=F(i,j+1)-F(i,j) \quad (6)$$

The weak static edge removal module 224a may include a thresholding module 2241a, a temporal difference module 2242a and a signal conversion module 2243a. The temporal difference module 2242a is coupled to the vertical edge detection module 222a to receive the vertical edges which are detected by the vertical edge detection module 222a. The temporal difference module 2242a is configured to detect the moving vertical edges between frame F1 and F2 according to the detected vertical edges. In an example, the moving vertical edges may be obtained by directly subtracting each of a value in the first vertical edge map E1 with a corresponding value in the second vertical edge map E2. The moving vertical edges detected by the vertical edge detection module 222a are stored in the binary map D1. Mathematically, the binary D1 can be obtained by equation (4). As shown in FIG. 2B, the binary map D1 which represents the temporal differences between the moving vertical edges between the frames F1 and F2 is outputted to the signal conversion module 2243a by the temporal difference module 2242a.

The thresholding module 2241a is configured to distinguish strong edges from weak edges, where the strong edges are potentially related to text and are significantly different from background while the weak edges are not related to text and are not significantly different from background. Mathematically, the strong edge map can be calculated according to equation (7) as follows:

$$B(i,j) = \begin{cases} E(i,j) & |E(i,j)| > T \\ 0 & \text{else} \end{cases} \quad (7)$$

where B(i,j) is strong edge map at position (i,j); E(i,j) is edge map at position (i,j); and T is predetermined threshold.

When the absolute value of the edge map E(i,j) is greater than the predetermined threshold T, the strong edge map B(i,j) stores the value of E(i,j). Otherwise, the strong map B(i,j) store 0 which represent that the position (i,j) has weak edges or no edge and are not likely to have text. The strong edge maps B1 and B2 which represent the strong vertical edges in frames F1 and F2 respectively are outputted by the thresholding module 2241a.

The signal conversion module 2243a is coupled to the temporal difference module 2242a and the thresholding module 2241a to receive the binary map D1 and the strong edge maps B1, B2. The signal conversion module 2243a is configured to convert the information stored in the binary map D1 and the strong edge maps B1, B2 to a map V that may represent rising edges, falling edges, and non-edge in each position of the frames F1, F2. The map V may be obtained by the equation (5) above.

The non-ST edge removal module 226a includes a stroke width computation module 2261a and a single edge & non-ST edge pairs removal module 2262a. The stroke width computation module 2261a is configured to determine the edge-pairs, each having a rising edge and a falling edge, where the distance between the rising edge and the falling edge is within a predetermined interval. Preferably, the distance between the rising edge and the falling edge is the stroke width of text characters in the video sequence. As such, the edges that are not one of the edge-pairs or the edge-pairs that the distance between the rising edge and the falling edge is too large or too small (outside of the predetermined interval) are eliminated from the edge-pair set that is considered as being related to text in the video sequence.

The signal edge removal module 2262a is configured to remove the single edges in the map V, where the single edges are not belonged to any of the edge-pairs.

The text block module 228a in FIG. 2B is similar to the edge detection module 222 shown in FIG. 2A, thus the detailed description of the text block module 228a is omitted herein.

FIG. 2C illustrates the text detection module 220b according to an embodiment of the invention. The text detection module 220b includes the substantially similar to the modules as the text detection module 220a, and the function of the text detection module 220b is also substantially similar to that of the text detection module 220a. The difference between the text detection module 220b and the text detection module 220a is that the text detection module 220b includes a horizontal edge detection module 222b instead of the vertical edge detection module 222a. The horizontal edge detection module 222b is configured to detect the horizontal edges (E1, E2) of the frame F1 and F2, and output the detected horizontal edges (E1, E2) to the temporal difference module 2242b and the thresholding module 2241b. The remaining modules (temporal difference module 2242b, thresholding module 2241b, signal conversion module 2243b, stroke width computation module 2261b, single edge & non-ST edge pairs removal module 2262b and text block module 228b) of the text detection module 220b are the substantially same as the corresponding modules of the text detection module 220a, thus the detailed description regarding these modules is omitted herein. At the output of the text detection module 220b, the text blocks in the horizontal direction are provided for the subsequence processes.

In an embodiment, each of the modules depicted in FIGS. 1-2C may be implemented as one or more circuits. The invention is not intended to limit whether each of the modules depicted in FIG. 1 and FIGS. 2A-2C is implemented by ways of software or hardware.

As the example shown in FIG. 1, the motion estimation module 110, the text detection module 120, the text prediction module 150, the motion vector assignment module 160 and the motion compensation module 170 may be implemented by using one or more circuits (e.g., hardware circuits), and the ST judgment module 130 and the previous scrolling information module 140 may be implemented as software modules which are executed by a processor or a microprocessor. In FIG. 2A, all the modules which include the edge detection module 222, the weak static edge removal module 224, the non-ST edge removal module 226 and the text block module 228 may be implemented by using one or more circuits (e.g., hardware circuits). Similarly, all the modules shown in FIGS. 2B-2C may be implemented by hardware circuits.

FIG. 3A-3B illustrate exemplary examples of a first motion vector histogram (e.g., x-component of the motion vector) and a second motion vector histogram (y-component of the motion vector), respectively. As aforementioned, the ST judgment module 130 in FIG. 1 is configured to build the first motion vector histogram Hx and the second motion vector histogram Hy according to the text blocks detected by the text detection module 120. Each of the text blocks is associated with a motion vector which indicates the motion of the moving edges. The motion vector of each text block has a first component (x-component) and a second component (y-component) which are corresponding to the horizontal direction and vertical direction, respectively. The first component of the motion vector corresponds to the motion in the horizontal direction, and the second component of the motion vector corresponds to the motion in the vertical direction.

As shown in FIG. 3A, the motion vectors of the text blocks concentrate around bin 0 and bins 21-22 of the first motion vector histogram Hx, and the local peak of the first motion vector histogram is at the bin 21. In FIG. 3B, most of the motion vectors of the text blocks concentrate around bin 0 of the second motion vector histogram Hy. The above first and second motion vector histograms may indicate that there is scrolling text in the horizontal direction and there is no scrolling text in the vertical direction.

Figure 4:
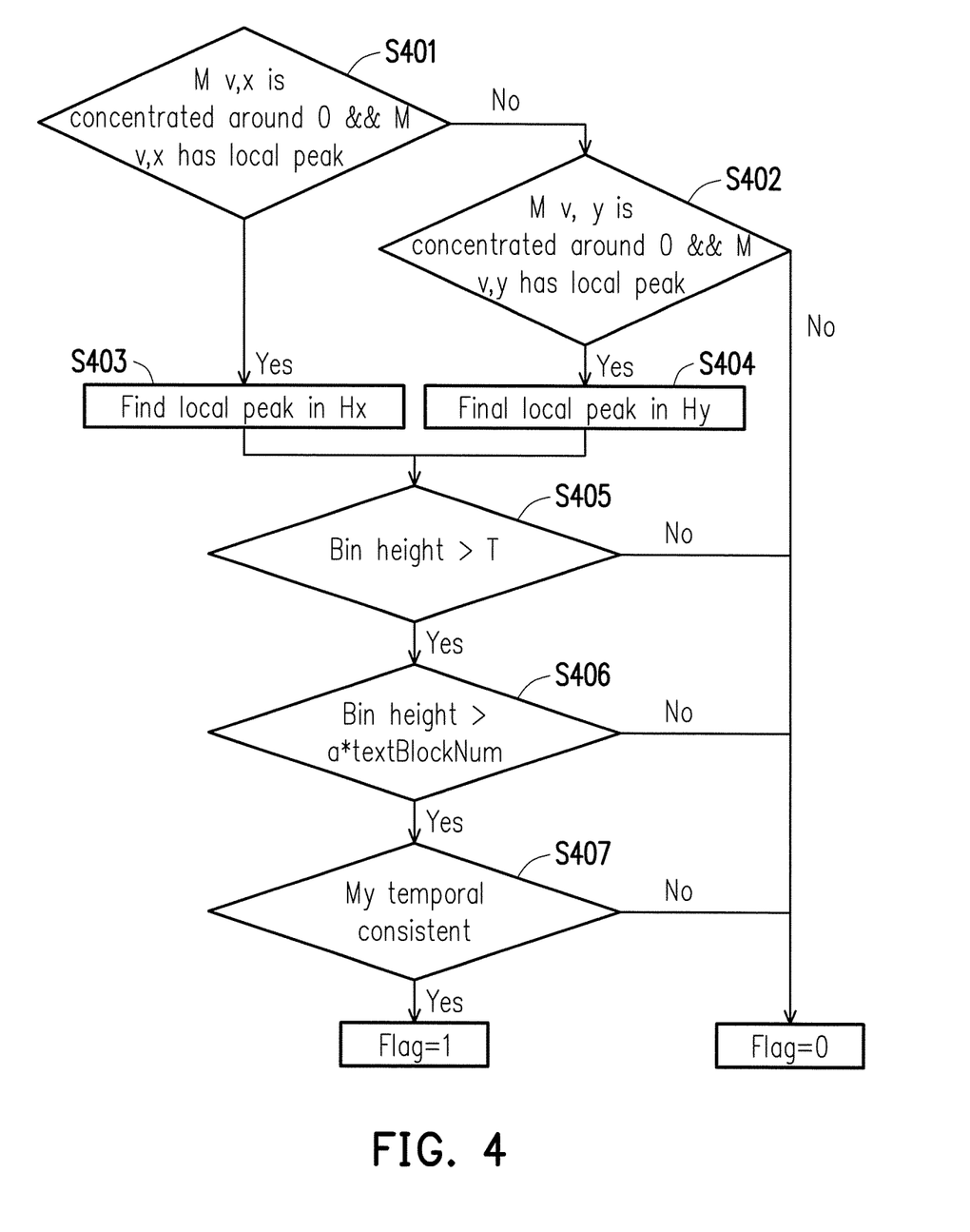
FIG. 4 illustrates a flowchart diagram of steps for determining whether there is scrolling text in a video sequence according to an embodiment of the invention.

FIG. 4 illustrates a flowchart diagram of steps executed by the ST judgment module 130 for determining whether there is scrolling text in a video sequence according to an embodiment of the invention. In steps S401, the ST judgment module 130 determines whether motion vectors M v,x in the first motion vector histogram Hx are concentrated around bin 0 and whether the first motion vector histogram Hx has a local peak. If yes, a first local peak of the first motion vector histogram Hx is calculated in step S403. If no, the ST judgment module 130 determines whether the motion vectors M v,y in the second motion vector histogram Hy are concentrated ground bin 0 and whether the second motion vector histogram Hy has a local peak in step S402. If yes, a second local peak of the second motion vector histogram Hy is determined in step S404. If no, the ST judgment module 130 set a flag to 0 to indicate that there is no scrolling text in the frames F1, F2.

If the first local peak (the local peak that is not concentrated around 0) is detected in step S403, the horizontal direction is regarded as the direction of the scrolling text, and the first local peak is regarded as the local peak corresponding to the motion vector of the scrolling text. If the second local peak (the local peak that is not concentrated around 0) is detected in step S404, the vertical direction is regarded as the direction of the scrolling text, and the second local peak is regarded as the local peak corresponding to the motion vector of the scrolling text.

In step S405, the ST judgment module 130 determines whether the local peak corresponding to the motion vector of the scrolling text exceeds a predetermined threshold T. If the local peak does not exceed the predetermined threshold T, then ST judgment module 130 sets the flag to 0; otherwise, go to step 406.

In step 406, the ST judgment module 130 determines whether the local peak corresponding to the motion vector of the scrolling text exceeds a proportional value of text block number (a*textBlockNum), where a is a decimal. In an example, a is smaller than 1. If the local peak corresponding to the motion vector of the scrolling text does not exceed the proportional value of text block number, the flag is set to 0 and there is no scrolling text in frames F1, F2.

In step 407, the ST judgment module 130 determines whether the local peak corresponding to the motion vector of the scrolling text is consistent over few successive frames in the video sequence. The previous local peaks associated with previous frame may be obtained from the previous scrolling information module 140 as shown in FIG. 1. If the local peak is not consistent over few successive frames, then the flag is set to 0 and there is no scrolling text in the frames F1, F2.

Generally speaking, the ST judgment module 130 determines that there is scrolling text in the frames F1, F2 when a set of conditions is satisfied. The set of condition includes:

(i) one of the first local peak and the second local peak is concentrated at zero and the other one is corresponding to the motion vector of the scrolling text;

(ii) the local peak corresponding to the motion vector of the scrolling text exceeds a preset threshold;

(iii) the local peak corresponding to the motion vector of the scrolling text exceeds a proportional value of text block numbers; and (iv) the local peak corresponding to the motion vector of the scrolling text remain unchanged among a number of successive frames in the video sequence.

Once it is determined that scrolling text is existed, the direction of the scrolling text is determined as the direction of the motion vector histogram that is not concentrated around 0 of the text blocks, and the motion vector of the scrolling text is determined as the motion vector corresponding to the local peak. For example, once the local peak of the horizontal motion vector histogram satisfies the set of conditions, the scrolling text is existed in the horizontal direction, the horizontal direction is determined as the direction of the scrolling text, and the motion vector associated with the local peak of the horizontal motion vector histogram is determined as the motion vector of the scrolling text.

FIG. 5 is shows the interpolation of text regions to form an interpolated text region from two successive frames according to an embodiment of the invention. As shown in FIG. 5, the scrolling text is existed in the horizontal direction, and the motion vector MV(v, 0) is the motion vector of the scrolling text. Each scrolling text pixel value of the interpolated frame $f_{inter}$ is obtained based on the motion vector MV(v,0) of the scrolling text and scrolling text region in at least one of the frames $f_n$ and $f_{n+1}$.

Figure 6:
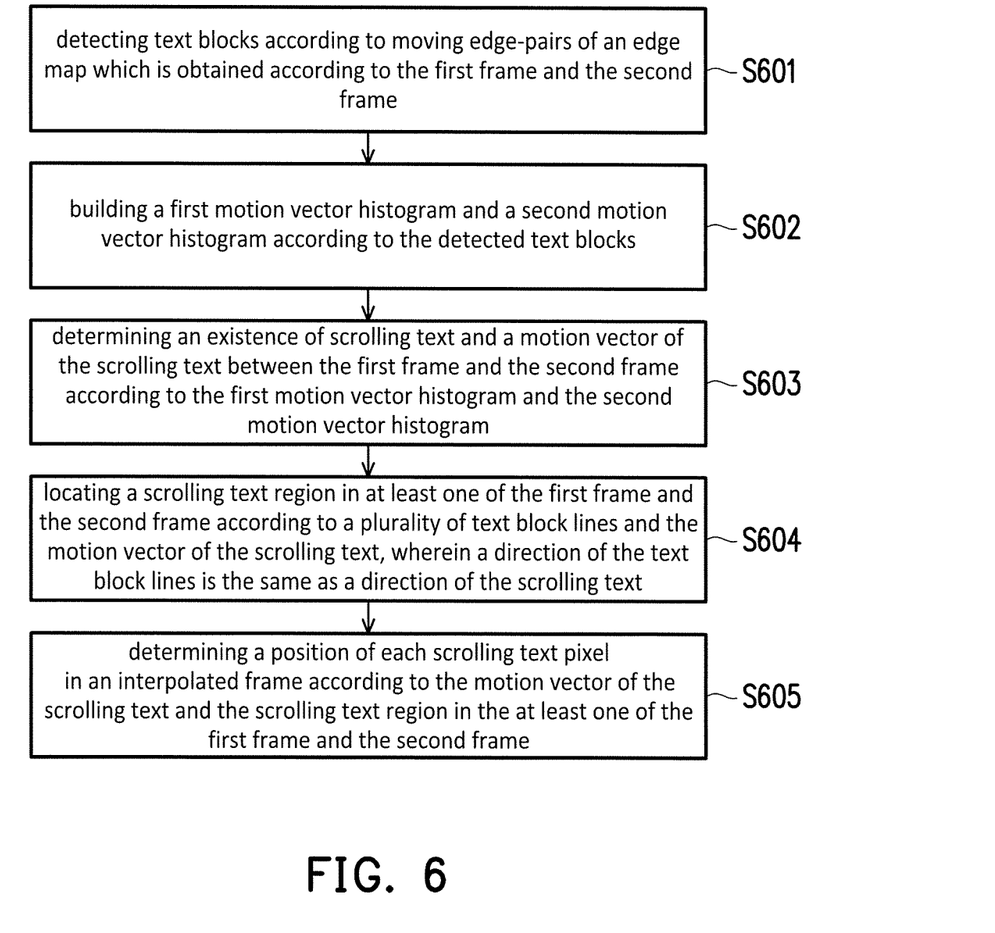
FIG. 6 is a flowchart illustrating an image processing method according to an embodiment of the present application.

FIG. 6 illustrates an image processing method according to an embodiment of the present application. In step S601, the image processing method detects text blocks) according to moving edge-pairs of an edge map. The edge map is obtained according to the first frame F1 and the second frame F2, where the first frame F1 and the second frame F2 may be successive frames, but the invention is not limited thereto. It should be noted that the edge-pairs that the distance between the rising edge and the falling edge is outside the predetermined interval is eliminated from the edge-pair set that is used to detect the text blocks.

In step S602, the image processing method builds a first motion vector histogram and a second motion vector histogram according to the detected text blocks. For example, the first motion vector histogram is the horizontal motion histogram Hx illustrated in FIG. 3A, and the second motion vector histogram is the vertical motion vector histogram Hy illustrated in FIG. 3B.

In step S603, the image processing method determines an existence of scrolling text and a motion vector of the scrolling text between the first frame and the second frame according to the first motion vector histogram and the second motion vector histogram. As aforementioned, a set of conditions are used to determine the existence of the scrolling text, the direction of the scrolling text and the motion vector of the scrolling text.

In step S604, the image processing method locates a position of a scrolling text region according to a plurality of text block lines and the motion vector of the scrolling text, wherein a direction of the text block lines is the same as a direction of the scrolling text. Block lines are used as a basic unit for determining the scrolling text region. If the direction of the scrolling text is x (horizontal direction), a row of blocks is regarded as a block line; and a column of blocks are regarded as the block line when the direction of the scrolling text is y (vertical direction). To determine whether the current block line is a text block line, the following steps will be finished:

(i) Computing a motion vector histogram of text blocks in current block line;

(ii) Determining a peak of the histogram, where the peak represents the most appearing motion vectors of the current block line; and (iii) Judging the similarity between the peak of the histogram and local peak of the scrolling text.

If the similarity is high, the current block line is marked as a text block line. Since scrolling text region is comprised of a number of text block lines, isolated text block line should be removed from the text region set. In addition, since text region should be consistent over frames, temporal scrolling text region information can be used to determine whether the current block line is a text block line.

In step S605, the image processing method determines a position of each scrolling text pixel in an interpolated frame according to the motion vector of the scrolling text and scrolling text region in at least one of the first frame and the second frame. As illustrated in equations (1) and (2), each scrolling text pixel value of the interpolated frame $f_{int\ er}$ is determined according to the motion vector of the scrolling text and scrolling text region in at least one of the frames $f_n$ and $f_{n+1}$.

Figure 7:
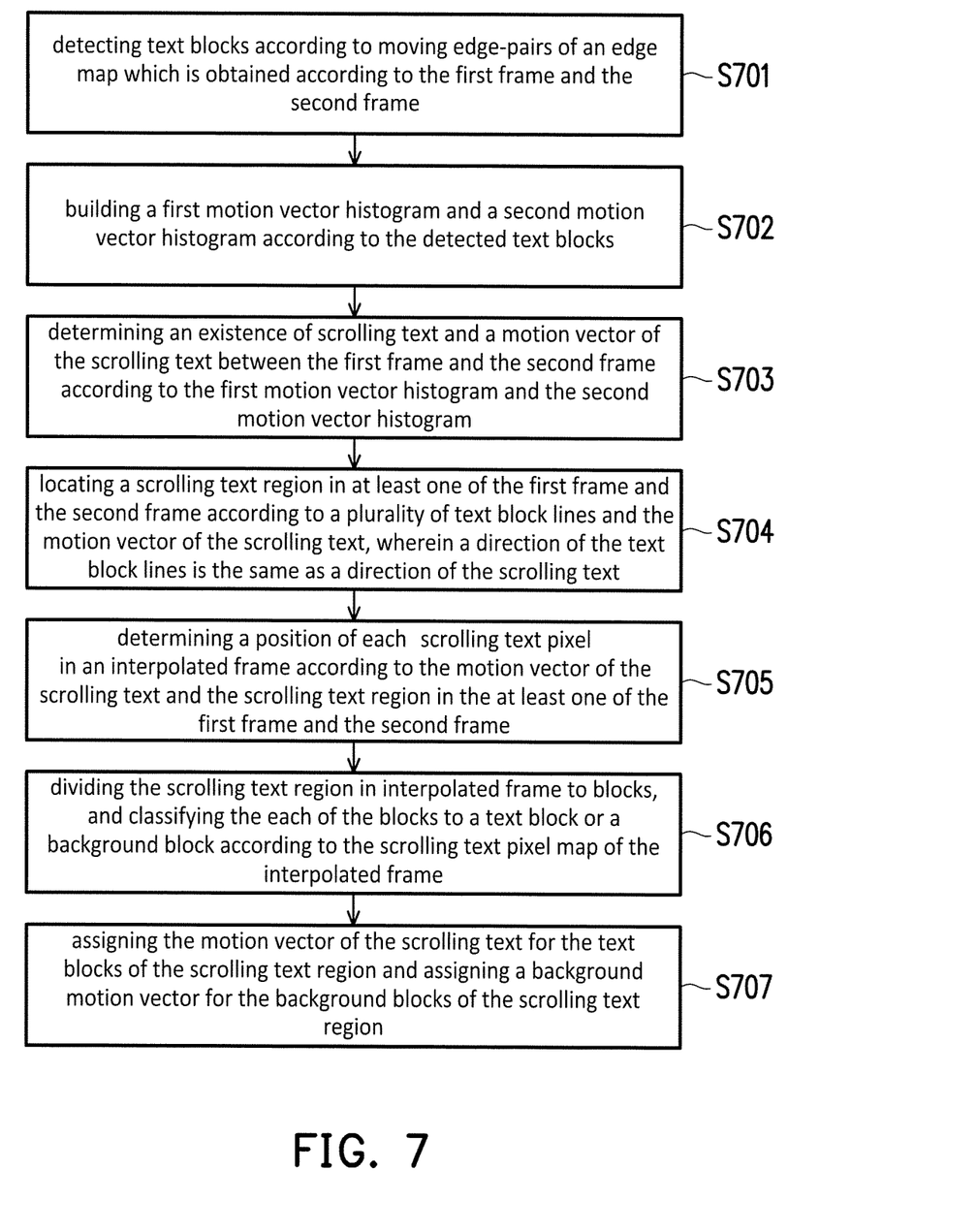
FIG. 7 is a flowchart illustrating an image processing method according to another embodiment of the present application.

FIG. 7 illustrates an image processing method according to another embodiment of the present application. Referring to FIG. 6 and FIG. 7, steps S701 to S705 in FIG. 7 are the same as the steps S601 to S605 in FIG. 6, thus the detailed description is omitted herein. In step S706, the scrolling text region in interpolated frame is divided into blocks, and each of the blocks is classified to a text block or a background block according to the scrolling text pixel map of the interpolated frame.

In step S707, the motion vector of the scrolling text is assigned to text blocks of the scrolling text regions, and non-text motion vector is assigned to non-text blocks of the scrolling text region. In this way, the text region blocks of the interpolated frame are divided into a several different types (e.g., text blocks and non-text blocks within the scrolling text regions) which are assigned with corresponding motion vectors. Accordingly, the apparent visual artifacts in the interpolated frame is significantly reduced.

In summary, in exemplary embodiments of the invention, the moving edge-pairs in frames are utilized to determine the edges related to text and eliminate irrelevant edges at the same time, thereby improving the accuracy in detecting text and reducing the computational cost of the subsequent processes. In addition, by employing the scrolling text information (e.g., direction of the scrolling text, motion vector of the scrolling text) and the detected edges related to the text in determining the scrolling text regions in the interpolated frame, the positions of the scrolling text regions in the interpolated frame are correctly identified. Furthermore, the scrolling text block regions are divided into text blocks and background blocks, where the text blocks and background blocks are assigned with different motion vectors (e.g., text motion vector and background motion vector) in the interpolated frame. In this way, appropriate motion vector is assigned to appropriate blocks in the interpolated frame, the positions of the text blocks in the interpolated frame are correctly identified, and the visual artifacts in the interpolated frame are effectively eliminated. Accordingly, the invention may achieve the effects of accurately detecting scrolling text with false positive as few as possible, accurately interpolate text regions, and effectively eliminate the artifacts of other regions in the interpolated frame, hence give viewers a much more comfortable visual experience.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A image processing method on a video sequence having a first frame and a second frame, comprising:

detecting text blocks according to moving edge-pairs of an edge map which is obtained according to the first frame and the second frame;

building a first motion vector histogram and a second motion vector histogram according to the detected text blocks;

determining an existence of scrolling text and a motion vector of the scrolling text between the first frame and the second frame according to the first motion vector histogram and the second motion vector histogram;

locating a scrolling text region in at least one of the first frame and the second frame according to a plurality of text block lines and the motion vector of the scrolling text, wherein a direction of the text block lines is the same as a direction of the scrolling text; and determining a position of each scrolling text pixel in an interpolated frame according to the motion vector of the scrolling text and the scrolling text region in the at least one of the first frame and the second frame.

2. The image processing method of claim 1, wherein the step of detecting the text blocks according to the moving edge-pairs of the edge map comprises:

detecting moving edges between the first frame and the second frame;

determining the moving edge-pairs of the edge map among the detected moving edges, wherein each of the moving edge-pairs comprises a rising edge and a falling edge, and a distance between the rising edge and the falling edge is within a predetermined interval.

3. The image processing method of claim 2, wherein the step of detecting moving edges between the first frame and the second frame comprises:

detecting edges in the first frame and the second frame to obtain a first edge map and a second edge map respectively;

calculating a difference between the first edge map and the second edge map to obtain the moving edges between the first frame and the second frame; and removing static and weak edges, wherein the absolute difference of the static and weak edges are smaller than a predetermined threshold.

4. The image processing method of claim 2, wherein the distance between the rising edge of an edge-pair and the falling edge of the edge-pair defines a stroke width of the scrolling text.

5. The image processing method of claim 1, wherein the step of determining the existence of the scrolling text and the motion vector of the scrolling text between the first frame and the second frame comprises:
- determining a first local peak of the first motion vector histogram and a second local peak of the second motion vector histogram;
- determining whether one of the first local peak and the second local peak is concentrated at zero and the other one is not concentrated at zero;
- in response to determining that one of the first local peak and the second local peak is concentrated at zero and the other one is not concentrated at zero, determining that the local peak that is not concentrated at zero is a local peak corresponding to the motion vector of the scrolling text;
- determining whether the local peak corresponding to the motion vector of the scrolling text exceeds a predetermined threshold;
- determining whether the local peak corresponding to the motion vector of the scrolling text exceeds a proportional value of text block numbers; and
- determining whether the local peak corresponding to the motion vector of the scrolling text remain unchanged among a number of successive frames in the video sequence.

6. The image processing method of claim 5, wherein there is scrolling text between the first frame and the second frame when a set of conditions is satisfied, the set of conditions comprises:
   (i) one of the first local peak and the second local peak is concentrated at zero and the other one is corresponding to the motion vector of the scrolling text;
   (ii) the local peak corresponding to the motion vector of the scrolling text exceeds a preset threshold;
   (iii) the local peak corresponding to the motion vector of the scrolling text exceeds a proportional value of text block numbers; and
   (iv) the local peak corresponding to the motion vector of the scrolling text remain unchanged among a number of successive frames in the video sequence.

7. The image processing method of claim 5, wherein
   the direction of the scrolling text is the same as the first direction when the first local peak is corresponding to the motion vector of the scrolling text, and
   the direction of the scrolling text is the same as the second direction when the second local peak is corresponding to the motion vector of the scrolling text.

8. The image processing method of claim 1, wherein the step of locating the scrolling text region in the at least one of the first frame and the second frame according to the plurality of text block lines and the motion vector of the scrolling text comprises:
   determining the plurality of text block lines among a plurality of block lines, wherein each of the block lines is extended in the direction of scrolling text and each of the block lines comprises a series of blocks; and
   eliminating isolated text block lines and setting a region that comprises a plurality of successive text block lines as the scrolling text region.

9. The image processing method of claim 8, wherein the step of determining the plurality of text block lines among the plurality of block lines comprises:
   calculating a motion vector histogram of text blocks in each of the block lines;
   determining a peak of the histogram;
   comparing a similarity between the peak of the histogram and the local peak corresponding to the motion vector of the scrolling text to obtain a comparison value; and
   determining that the block line is one of the text block lines in response to determining that the comparison value is greater than a predetermined value.

10. The image processing method of claim 1, further comprising:
    dividing the scrolling text region in interpolated frame to blocks, and classifying the each of the blocks to a text block or a background block according to the scrolling text pixel map of the interpolated frame; and
    assigning the motion vector of the scrolling text for the text blocks of the scrolling text region and assigning a background motion vector for the background blocks of the scrolling text region.

11. An image processing apparatus, comprising:
    a memory, configured to store a plurality of modules; and
    a processor configured to executing the plurality of modules stored in the memory, the plurality of module comprises:
    a text detection module, configured to detect text blocks according to moving edge-pairs of an edge map which is obtained according to the first frame and the second frame;
    a scrolling text judgment module, configured to build a first motion vector histogram and a second motion vector histogram according to the text blocks which are detected by the text detection module, and configured to determine an existence of scrolling text and a motion vector of the scrolling text between the first frame and the second frame according to the first motion vector histogram and the second motion vector histogram;
    a text prediction module, configured to locate a scrolling text region in at least one of the first frame and the second frame according to a plurality of text block lines and the motion vector of the scrolling text, wherein a direction of the text block lines is the same as a direction of the scrolling text, and the prediction module is further configured to determine a position of each scrolling text pixel in an interpolated frame according to the motion vector of the scrolling text and the scrolling text region in the at least one of the first frame and the second frame.

12. The image processing apparatus of claim 11, wherein the text detection module is further configured to:
    detect moving edges between the first frame and the second frame,
    determine the moving edge-pairs of the edge map among the detected moving edges, wherein each of the moving edge-pairs comprises a rising edge and a falling edge and a distance between the rising edge and the falling edge is within a predetermined interval.

13. The image processing apparatus of claim 12, wherein the text detection module is further configured to
    detect edges in the first frame and the second frame to obtain a first edge map and a second edge map respectively;
    calculate a difference between the first edge map and the second edge map to obtain the moving edges between the first frame and the second frame; and
    remove static and weak edges, wherein the absolute difference of the static and weak edges are smaller than a predetermined threshold.

14. The image processing apparatus of claim 12, wherein the distance between the rising edge of an edge-pair and the falling edge of the edge-pair defines a stroke width of the scrolling text.

15. The image processing apparatus of claim 11, wherein the ST judgment module is further configured to determine a first local peak of the first motion vector histogram and a second local peak of the second motion vector histogram;

determine whether one of the first local peak and the second local peak is concentrated at zero and the other one is not concentrated at zero;

determine that the local peak that is not concentrated at zero is a local peak corresponding to the motion vector of the scrolling text in response to determining that one of the first local peak and the second local peak is concentrated at zero and the other one is not concentrated at zero;

determine whether the local peak corresponding to the motion vector of the scrolling text exceeds a predetermined threshold;

determine whether the local peak corresponding to the motion vector of the scrolling text exceeds a proportional value of text block numbers; and determine whether the local peak corresponding to the motion vector of the scrolling text remain unchanged among a number of successive frames in the video sequence.

16. The image processing apparatus of claim 15, wherein the ST judgment module is further configured to determine that there is scrolling text between the first frame and the second frame when a set of conditions is satisfied, the set of conditions comprises:

(i) one of the first local peak and the second local peak is concentrated at zero and the other one is corresponding to the motion vector of the scrolling text;

(ii) the local peak corresponding to the motion vector of the scrolling text exceeds a preset threshold;

(iii) the local peak corresponding to the motion vector of the scrolling text exceeds a proportional value of text block numbers; and (iv) the local peak corresponding to the motion vector of the scrolling text remain unchanged among a number of successive frames in the video sequence.

17. The image processing apparatus of claim 15, wherein the direction of the scrolling text is the same as the first direction when the first local peals is corresponding to the motion vector of the scrolling text, and the direction of the scrolling text is the same as the second direction when the second local peak is corresponding to the motion vector of the scrolling text.

18. The image processing apparatus of claim 11, wherein the text prediction module is configured to determine the plurality of text block lines among a plurality of block lines, wherein each of the block lines is extended in the direction of scrolling text and each of the block lines comprises a series of blocks, and eliminate isolated text block lines and setting a region that comprises a plurality of successive text block lines as the scrolling text region.

19. The image processing apparatus of claim 18, wherein the text prediction module is configured to calculate a motion vector histogram of text blocks in each of the block lines, determine a peak of the histogram, compare a similarity between the peak of the histogram and the local peak corresponding to the motion vector of the scrolling text to obtain a comparison value, and determine that the block line is one of the text block lines in response to determining that the comparison value is greater than a predetermined value.

20. The image processing apparatus of claim 11, further comprising:

a motion vector assignment module, configured to divide the scrolling text region in the interpolated frame to blocks;

classify each of the blocks to a text block or a background block according to the scrolling text pixel map of the interpolated frame; and assign the motion vector of the scrolling text for the text blocks of the scrolling text region and assigning a background motion vector for the background blocks of the scrolling text region.

\* \* \* \* \*